United States Patent [19]

Steinberger et al.

[11] 4,315,091
[45] Feb. 9, 1982

[54] COATINGS FOR THERMOPLASTICS

[75] Inventors: Helmut Steinberger; Manfred Schönfelder, both of Leverkusen; Hans-Heinrich Moretto; Christian Wegner, both of Cologne, all of Fed. Rep. of Germany

[73] Assignee: Bayer Aktiengesellschaft, Leverkusen, Fed. Rep. of Germany

[21] Appl. No.: 137,699

[22] Filed: Apr. 7, 1980

[30] Foreign Application Priority Data

Apr. 10, 1979 [DE] Fed. Rep. of Germany ....... 2914427

[51] Int. Cl.$^3$ ............................................. C08G 77/04
[52] U.S. Cl. ...................................... 528/28; 528/32; 528/39; 427/393.5; 428/412; 428/447
[58] Field of Search ............................ 528/28, 32, 39; 428/447, 412; 427/393.5

[56] References Cited

U.S. PATENT DOCUMENTS 4,207,357 6/1980 Goossens ........................... 428/412
4,239,798 12/1980 Schroeter ........................... 428/412

*Primary Examiner*—Melvyn I. Marquis
*Attorney, Agent, or Firm*—Sprung, Felfe, Horn, Lynch & Kramer

[57] ABSTRACT

A coating composition to improve the abrasion and scratch resistance of plastics such as polycarbonate, consisting essentially of about (A) 10-40% by weight of a partially hydrolyzed siloxane compound which is obtained by hydrolyzing in water at about 50°-80° C. over a period of about 1-12 hours at least one of
 (a) a hydrocarbon-trialkoxysilane of the formula R'Si(OR")$_3$ wherein
   R' is an alkyl group with 1 to 4 carbon atoms or a phenyl or vinyl group, and
   R" is an alkyl group with 1 to 4 carbon atoms,
 (b) a co-condensation product of (a) and about 1 to 40% by weight of a phenyl- or vinyl-trialkoxysilane, the alkoxy group containing 1 to 4 carbon atoms,
 (c) a co-condensation product of 1 mol of (a) and 0.05 to 1 mol of a tetraalkoxysilane, in which the alkoxy group contains 1 to 4 carbon atoms, and
 (d) a co-condensation product of 1 mol of (a) and 0.05 to 1 of a dialkyldialkoxysilane, in which the alkyl and alkoxy groups contain 1 to 4 carbon atoms.

9 Claims, No Drawings

COATINGS FOR THERMOPLASTICS

The present invention relates to protective coating formulations, in particular transparent abrasion-resistant and scratch-resistant coatings on transparent thermoplastic polymers, especially on polycarbonate.

There is a considerable need for unbreakable, light transparent materials which, compared with glass, are less fragile and have a lower specific weight. Such transparent materials and moldings can be produced from polycarbonates, polymethyl methacrylates, polystyrene or polyvinyl chloride. However, these substances have the disadvantage that they have a surface which is easily damaged and that they swell or are partly dissolved when they come into contact with organic solvents.

Various materials and processes have already been developed to improve these adverse properties of moldings, for example processes for coating the moldings with a coating composition which contains, as the main constituents, a hydrolysis product of a tetraalkoxysilane and a copolymer of a fluoroolefin and an ω-hydroxyalkyl vinyl ether (U.S. Pat. No. 3,429,845). In another process, moldings are coated with a hydrolysis product of an alkyltrialkoxysilane (U.S. Pat. No. 3,451,838). Another process uses products of partial hydrolysis of a tetraalkoxysilane and alkyltrialkoxysilanes for coating moldings (Japanese patent application No. 56,230/1973). Other proposals for the coating use polysilicic acids as the starting materials, and also use acrylic copolymers and etherified methylolmelamines, which are said to impart to the coated surfaces a good abrasion resistance and stability in water (Japanese patent application No. 34,214/1974). Instead of dissolved polysilicic acids, it is also possible to use dispersions of colloidal silicic acid together with products of partial hydrolysis of alkyltrialkoxysilanes (DE-OS (German Published Specification) No. 2,506,202 and DE-OS (German Published Specification) No. 2,446,279).

Materials which were produced by the processes described above could hitherto achieve only a limited economic importance, since they are difficult to use, have a moderate stability to moisture or are too expensive. Furthermore, the elasticity and adhesion of the hardened coating film is inadequate for application purposes in which the coated shaped articles are subjected to temporary changes in shape.

Attempts have also been made to improve the adhesion and elasticity of the film using combinations of aminoalkylalkoxysilanes and acryloxyalkylalkoxysilanes or vinylalkoxysilanes and combinations of epoxyalkylalkoxysilanes and acryloxyalkylalkoxysilanes or vinylalkoxysilanes. However, it was found that coatings prepared from these substances have a poor resistance to scratching.

The present invention was thus based on the object of providing a coating composition which forms, on the surface of shaped articles of organic thermoplastics, such as, for example, polycarbonate or polymethylmethacrylate, a protective layer with a high surface hardness, resistance to scratching, stability to solvents and resistance towards the formation of hairline cracks when subjected to changes in shape.

The object is achieved by improving the elasticity and the adhesion of the coating agent to the substrate material by adding blocked polyisocyanates to the polysilicic acid component, the hardness, resistance to scratching and stability to solvents of the coating being retained to their full extent.

The invention relates to a coating composition which essentially consists of about:

(A) 10 to 40% by weight, relative to the total weight of the coating agent, of a partially hydrolyzed siloxane compound which is obtained by hydrolyzing at least one of the following compounds in water at about 50° to 80° C. for a reaction time of up to about 12 hours: (a) a hydrocarbon-trialkoxysilane of the formula $R'Si(OR'')_3$ wherein R' denotes an alkyl group with 1 to 4 carbon atoms or a phenyl or vinyl group and R'' denotes an alkyl group with 1 to 4 carbon atoms, and/or (b) co-condensation products of (a) and about 1 to 40% by weight of a phenyl- or vinyl-trialkoxysilane, the alkoxy group containing 1 to 4 carbon atoms, and/or (c) co-condensation products of 1 mol of (a) and about 0.05 to 1 mol of a tetraalkoxysilane, in which the alkoxy group contains 1 to 4 carbon atoms, and/or (d) co-condensation products of 1 mol of (a) and about 0.05 to 1 mol of a dialkyldialkoxysilane, in which the alkyl and alkoxy groups contain 1 to 4 carbon atoms, (B) 0 to 40% by weight, relative to the total weight of the coating composition, of an aqueous dispersion of colloidal silicon dioxide, (C) 0 to 5% by weight, relative to the total weight of the coating agent, of an etherified methylolmelamine, (D) 0.05 to 15% by weight, relative to the total weight of the coating composition, of a blocked polyisocyanate, (E) 0.5 to 30% by weight, relative to the total weight of the coating composition, of acetic acid and (F) an inert organic solvent as the remainder.

The agent is applied to the surface of, for example, polycarbonate objects and is hardened. The coated polycarbonate objects have excellent properties such as surface hardness, resistance to scratching, stability to solvents and resistance towards the formation of hairline cracks under stress.

The new coating agents according to the invention have a long pot life. They can be applied to the surface of shaped polycarbonate objects and hardened at a temperature of about 80° C. to about 120° C. in order to evaporate off the solvents contained therein and to effect a condensation reaction.

The hydrocarbon-trialkoxysilanes (1) are multi-functional siloxane compounds of the formula $R'Si(RO'')_3$ wherein R' denotes an alkyl group with 1 to 4 carbon atoms or a phenyl or vinyl group and R'' denotes an alkyl group with 1 to 4 carbon atoms. Methyltriethoxysilane is preferred. A product of partial hydrolysis of hydrocarbon-trialkoxysilanes is obtained by treating the hydrocarbon-trialkoxysilanes with water and warming the resulting material at a temperature of 50° to 80° C. for 1 to 10 hours. The preparation of such products of partial hydrolysis is in itself known and is described, for example, in U.S. Pat. No. 3,451,838, DE-OS (German Published Specification) No. 1,923,290 and in U.S. Pat. No. 4,006,271.

A partially hydrolyzed co-condensation product which essentially contains 1 mol of the hydrocarbon-trialkoxysilane as the main component and 0.05 to 1 mol of a tetraalkoxy-(C 1 to C 4)-silane as the additional component forms a coating with improved hardness.

A partially hydrolyzed co-condensation product of 1 mol of a hydrocarbon-trialkoxysilane and 0.05 mol of a dialkyl-(C 1 to C 4)-dialkoxy-(C 1 to C 4)-silane forms a soft coating.

Additions of aqueous dispersions of colloidal silicon dioxide to the partially hydrolyzed (co)-condensation product of an alkyltrialkoxysilane and, if appropriate, a tetraalkoxysilane give coatings with improved hardness.

The etherified methylolmelamines which are optionally also used are industrial products which are prepared in a manner which is in itself known. Specific examples of these compounds are hexaalkoxymethylmelamines, such as hexamethoxymethylmelamine, hexaethoxymethylmelamine, hexapropoxymethylmelamine, hexaisopropoxymethylmelamine, hexabutoxymethylmelamine and hexacyclohexyloxymethylmelamine.

The etherified methylolmelamine is preferably used in an amount of 0 to 150 parts by weight per 100 parts by weight (calculated as $SiO_2$) of the product of partial hydrolysis of the tetraalkoxysilane compound and/or of the colloidal silicic acid. When more than 150 parts by weight of etherified methylolmelamine are added, the adhesion and the hardness of the coating decrease. Addition of the etherified methylolmelamine imparts both hardness and flexibility to the coating.

The blocked polyisocyanates added according to the invention are solvent-free, stable aqueous emulsions of blocked isocyanates, optionally containing about 2-4% by weight of polyethers, in which salts of diaminosulphonic acids are used as the emulsifying component. They are prepared by reacting any desired polyisocyanates, preferably difunctional to tetrafunctional polyisocyanates, with compounds which contain molecular groupings which are reactive towards isocyanate groups. Possible compounds are, inter alia, secondary or tertiary alcohols, C—H-acid compounds, oximes, lactams, phenols, N-alkylamides, imides, imidazoles, triazoles or alkali metal bisulphites. C—H-acid compounds, in particular compounds containing activated methylene groups, such as, for example, malonic acid dialkyl esters, acetoacetic acid alkyl esters or acetylacetone, are preferably employed.

The reaction of the polyisocyanate function with the molecular grouping which is reactive towards isocyanate groups is carried out in the presence of specific amounts of aromatic, aliphatic or araliphatic diaminesulphonic acids or alkali metal salts or ammonium salts thereof.

The blocked polyisocyanates used according to the invention are obtainable by reacting polyisocyanates with blocking agents, such as, for example, malonic acid diethyl ester or acetoacetic acid ethyl ester, in a reaction which is in itself known. The solubility or dispersibility of the blocked polyisocyanates depends on the inclusion, in the addition reaction, of hydrophilic components, of which the ionic or non-ionic polyethylene oxide segments, which have a dispersing action in water, are also incorporated as the polymer is built up.

By incorporating the ionic or non-ionic hydrophilic groups, the blocked polyisocyanates in question in turn become hydrophilic to the extent that they are soluble or form stable dispersions in water or in aqueous-alcoholic solutions or formulations and are compatible with the formulations suitable for coating the thermoplastic.

The use according to the invention of the blocked isocyanates described above leads to coatings with improved adhesion and elasticity, without adversely affecting the resistance to scratching and hardness of the coating.

The organic solvents which are used in addition to acetic acid are not critical. Possible solvents are alcohols, ketones, ethers and/or aromatic hydrocarbons, especially lower alkyl alcohols, ketones and ethers, benzene, toluene and xylenes. Of these solvents ethanol and isopropanol are particularly preferred for the preparation of the coating agent. The amount of organic solvents must be adequate to dissolve completely the partially hydrolyzed compound together with the acetic acid and the remaining additives mentioned and to adjust the concentration of the partially hydrolyzed compound to about 5 to 15% by weight, calculated as solids and relative to the total weight of the coating agent.

Any processes, such as the immersion process, spraying process or casting process, can be used to coat, according to the invention, thermoplastics with the coating agent. The thermoplastic articles thus coated are then warmed in order to harden the coating agent. The hardening temperature can usually take place in the range from about 60° to 140° C.

Since the required hardening temperature is higher the shorter the hardening time is, it is preferred to harden the applied layer at a temperature which is as high as possible, but lower than the heat distortion point of the thermoplastics. In general, it is preferable to carry out the hardening at about 80° to 120° C. for about 2 to 10 hours.

The invention is illustrated in still more detail in the following text.

EXAMPLE

Preparation of the base components:

(a) 19.8 g of glacial acetic acid, 210 g of distilled water and 227 g of isopropanol are added to 300 g of colloidal silicic acid with a $SiO_2$ content of 30% by weight. After thoroughly mixing the components, 900 g of methyltriethoxysilane are added and the mixture is warmed to 60° C., while stirring. It is left at this temperature for 4 hours, and a further 1,200 g of isopropanol are then added to the mixture. After cooling the product to room temperature, the slightly opaque solution is filtered.

(b) 340 g of isopropanol, 190 g of tetraethoxysilane and 360 g of methyltriethoxysilane are initially introduced into a vessel provided with a stirrer and reflux condenser. 180 g of 0.05 N hydrochloric acid are added to this mixture and the mixture is warmed under reflux for five hours to carry out the co-hydrolysis reaction. After the reaction, the mixture is cooled to room temperature. A solution which contains a product of partial hydrolysis of tetraethoxysilane (5.1 percent, calculated as $SiO_2$) and a product of partial hydrolysis of methyltriethoxysilane (12.6 percent, calculated as $CH_3SiO_{1.5}$) is obtained.

(c1) 335 g of tetraethoxysilane and 167 g of methyltriethoxysilane are dissolved in 350 g of isopropanol, 150 g of 0.05 N hydrochloric acid are added and the mixture is stirred at room temperature. When the reaction has ended, the mixture is left to stand at room temperature after 24 hours. The resulting solution contains a product of partial hydrolysis of tetraethoxysilane (9.6%, calculated as $SiO_2$) and a product of partial hydrolysis of methyltriethoxysilane (6.3%, calculated as $CH_3SiO_{1.5}$).

(c2) 415 g of tetraethoxysilane and 85 g of dimethyldiethoxysilane are dissolved in 350 g of isopropanol, 150 g of 0.05 N hydrochloric acid are added and the mixture is stirred at room temperature. When the reaction has ended, the mixture is left to stand after 24 hours. The resulting solution contains a product of partial hydrolysis of tetraethoxysilane (12%, calculated as $SiO_2$) and a product of partial hydrolysis of dimethyldiethoxysilane (4.2%, calculated as $(CH_3)_2SiO$).

Before being used as the coating agent, the two components in c1 and c2 are mixed with one another in a weight ratio of 1:1 and the mixture is dissolved in a mixture of 60 parts by weight of n-butanol, 40 parts by weight of acetic acid and 20 parts by weight of toluene.

The addition, according to the invention, of a blocked polyisocyanate is effected by simple mixing with the finished base component.

Preparation of a blocked isocyanate (1)

370 g of malonic acid diethyl ester are stirred with 2.7 g of sodium phenolate at room temperature for 15 minutes. 500 g of a biuretized hexamethylene diisocyanate (23.8% of NCO groups) are added and, when the exothermic reaction has subsided, the mixture is subsequently stirred at 90° C. for 3 hours. 40 g of an ethylene oxide polyether (MW=2,000) started from n-butanol and 1 ml of tin-II octoate are then added and the mixture is stirred at 90° C. for a further 3 hours. A solution of 46 g of sodium 2,4-diaminobenzenesulphonate in 150 ml of water is now added, the stirrer speed being increased, and the mixture is stirred at 60° C. for 2 hours. It is then diluted with 800 ml of water and subsequently stirred until a milky-opaque emulsion is obtained. The emulsion contains about 50% by weight of solids. The content of blocked NCO groups is about 5%.

Preparation of a blocked isocyanate (2)

67.5 g of butane-1,3-diol are added dropwise to 333 g of isophorone diisocyanate at 120° C. The mixture is stirred for 2 hours and cooled to 90° C. and 187 g of malonic acid diethyl ester, in which 3 g of sodium phenolate have first been dissolved, are added. The mixture is stirred at 90° C. for 3 hours. A solution of 42 g of the sodium salt of 2-(2-aminoethylamino)ethanesulphonic acid in 350 ml of isopropanol are then added, while cooling the mixture to 70° C. The mixture is stirred for 2 hours and a yellowish turbid solution, which can be diluted with water, of a blocked polyisocyanate is obtained.

Solids content: 70%
NCO content (blocked): 5.4%

Preparation of a blocked isocyanate (3)

The procedure followed is as indicated in Example 1, and when the reaction has ended, 200 ml of isopropanol are added instead of 800 ml of water. A clear, yellow liquid, diluted with water, is obtained. The solution contains about 76% by weight of solids. The content of blocked NCO groups is 7.6%.

Coating of substrates and testing of the properties of the coatings:

3 mm thick plates of a commercially available polycarbonate (Makrolon (R)) or polymethyl methacrylate are cleaned with water and isopropanol and then coated with the coating composition. The coated plates are heated to 120° C. in a hot air drier for 2 hours to harden the coating composition.

After being hardened, the coated plates are stored at room temperature for 2 days and then subjected to the following experiments:

1. Adhesion to the substrate material

The hardened layer applied to the plate is notched crosswise down to the substrate with a sharp blade such that 100 cells with an area of 1 mm² are formed. A regenerated cellulose adhesive tape is then stuck onto the lines cut crosswise and pulled off at an angle of 90° to the layer applied. The process is repeated three times. The adhesion values obtained are divided into five classes from 0 (no delamination) to 4 (complete delamination), depending on the number of cells which remain (DIN 53151).

2. Resistance to scratching (steel wool abrasion experiment)

The coated surface of the plates is rubbed with a sample of steel wool of fineness 0000. The results are evaluated according to the following three categories, depending on the extent to which the surface was scratched.

A=no scratches, even when the surface is rubbed hard with steel wool
B=scratched somewhat when the surface was rubbed with steel wool
C=slightly scratched when the surface was rubbed moderately with the steel wool.

3. Lift/thrust method

The abrasion resistance of the coating obtained with the coating composition of the invention is demonstrated by an oscillating abrasion test. This test is carried out in a special device which essentially consists of a shaking plate, in a housing, which is operated in pendulum fashion at a frequency of 150 min$^{-1}$ and a stroke of 10 cm by a motor. The coated substrate to be investigated is attached to this shaking plate. With the aid of an abrasive, which is in pressure contact with the coated surface, the number n of thrusts which cause a particular clouding of the surface of 2 or 3% at a constant contact force of the abrasive is determined.

4. Taber abrasion method (ASTM D 1044)

The test apparatus consists of a plate arranged horizontally, on which the test piece is clamped. The plate is driven at a speed of 55±6 revolutions/minute. Two cylindrical abrasive bodies (CS-10 F) are arranged vertically and in a rotatable manner such that they have an abrasive action on the surface of the test piece under a load of 1,000 g in each case. The clouding caused by the abrasion is measured in a sphere photometer in accordance with the method of ASTM 1003. The clouding is measured on two samples in the condition at the time of supply and after 10, 25, 50, 100 and 200 revolutions. The increase in clouding (difference between the end clouding and the clouding in the condition at the time of supply) and the number of revolutions for a 5% increase in clouding are shown.

5. Trickling sand method

In the trickling sand test, 3,000 g of sand (particle size: 0.4–0.8 mm) are allowed to fall freely from a certain height (about 200 cm) and at a certain rate (200 g/minute) onto the surface of the test piece, which is at an angle of 45°. Abraded spots are formed. Light is then shone onto the surface at an angle of 45°, and the intensity of the reflection at an angle of 45° is determined. The resistance to scratching is determined from the percentage ratio of the reflection intensities after and before the test.

Results
Scratch-resistant coatings with and without an additive
(melamine resin or blocked isocyanate)

| Additive to base component (a) | % by weight of additive | Taber Abraser (Test 4) 1,000 g load abrasive roll CS 10 abrasion in mg after | | Resistance to scratching steel wool* (Test method 2) | Adhesion cut grid/ Tesa (Test method 2) | Lift/thrust method number of strokes for | | Trickling sand method 3 kg of sand clouding in % (Test method 5) |
| --- | --- | --- | --- | --- | --- | --- | --- | --- |
| | | 500 n | 1,000 n | | | 2% clouding (Test 3) | 3% clouding | |
| Melamine/formaldehyde resin (hexamethoxy- | 0.7 | 21.9 | 32.6 | comparable to slightly better | 1 | 11.25 | 18 | 9.1% |
| Blocked isocyanate (2) | 1.5 | 4.1 | 7.3 | somewhat better B | 1 | 19.25 | 30.1 | 6,0 |
| (1) | 1.5 | 5.8 | 15.6 | better A | 1 | 13.0 | 22.7 | 7,9 |
| (3) | 1.5 | 3.9 | 11.4 | significantly better A | 1 | 20.2 | 35.5 | 5,3 |
| No additive | — | 4.4 | 13.4 | comparable C | 3 | 17 | 30 | 13.0% |

*The resistance to scratching was assessed in a comparison method using a commercial product based on a silicone-free melamine resin.

It will be appreciated that the instant specification and examples are set forth by way of illustration and not limitation, and that various modifications and changes may be made without departing from the spirit and scope of the present invention.

What is claimed is:

1. A coating composition consisting essentially of about
   (A) 10–40% by weight of a partially hydrolyzed siloxane compound which is obtained by hydrolyzing in water at about 50°–80° C. over a period of about 1–12 hours at least one of (a), (b), (c), and (d), wherein
      (a) is a hydrocarbon-trialkoxysilane of the formula R'Si(OR")₃ wherein
         R' is an alkyl group with 1 to 4 carbon atoms or a phenyl or vinyl group, and
         R" is an alkyl group with 1 to 4 carbon atoms
      (b) is a co-condensation product of (a) and about 1 to 40% by weight of phenyl- or vinyl-trialkoxysilane, the alkoxy group containing 1 to 4 carbon atoms,
      (c) is a co-condensation product of 1 mol of (a) and 0.05 to 1 mol of a tetraalkoxysilane, in which the alkyl and alkoxy groups contain 1 to 4 carbon atoms,
   (B) 0 to 40% by weight of an aqueous dispersion of colloidal silicon dioxide,
   (C) 0 to 5% by weight of an etherified methylolmelamine,
   (D) 0.05 to 15% by weight of a blocked polyisocyanate,
   (E) 0.5 to 30% by weight of acetic acid, and
   (F) an inert organic solvent as the remainder.

2. A composition according to claim 1 wherein (A) is (a).

3. A composition according to claim 1, wherein (A) is (b).

4. A composition according to claim 1, wherein (A) is (c).

5. A composition according to claim 1, wherein (A) is (d).

6. A composition according to claim 1, wherein R'Si(OR")₃ comprises methyltriethoxysilane.

7. A composition according to claim 1, wherein etherified methylolamine of (C) is a lower alkyl or cycloalkyl ether.

8. A thermoplastic polymer coated with a composition according to claim 1.

9. Polycarbonate coated with a composition according to claim 1.

* * * * *

UNITED STATES PATENT AND TRADEMARK OFFICE
CERTIFICATE OF CORRECTION

PATENT NO. : 4,315,091
DATED : Feb. 9, 1982
INVENTOR(S) : Helmut Steinberger et al It is certified that error appears in the above-identified patent and that said Letters Patent are hereby corrected as shown below:

On the title page,
Abstract after last line  Insert
-- B) 0 to 40% by weight of an aqueous dispersion of colloidal silicon dioxide,
C) 0 to 5% by weight of an etherified methylolmelamine,
D) 0.05 to 15% by weight of a blocked polyisocyanate,
E) 0.5 to 30% by weight of acetic acid, and
F) an inert organic solvent as the remainder.--.

Signed and Sealed this

Twenty-ninth Day of June 1982

[SEAL]

Attest:

GERALD J. MOSSINGHOFF

Attesting Officer    Commissioner of Patents and Trademarks